United States Patent [19]

D'Amato

[11] 4,197,991
[45] Apr. 15, 1980

[54] GREENHOUSE ENVIRONMENTAL CONTROL SYSTEM

[76] Inventor: Cyrus D'Amato, 8 Parkway Dr., Roslyn Heights, N.Y. 11577

[21] Appl. No.: 919,812

[22] Filed: Jun. 28, 1978

[51] Int. Cl.² .......................................... G05D 22/02
[52] U.S. Cl. .................................. 236/44 A; 98/30; 261/DIG. 34
[58] Field of Search .............. 236/44 R, 44 A; 98/30, 98/33 A; 47/17; 261/DIG. 34, 30, 66; 62/176 C; 165/20

[56] References Cited

U.S. PATENT DOCUMENTS

| | | | |
|---|---|---|---|
| 2,300,776 | 11/1942 | Collins | 236/44 R X |
| 3,078,780 | 2/1963 | Bottlander | 47/17 X |
| 3,348,922 | 10/1967 | Bose et al. | 236/44 R X |
| 3,363,531 | 1/1968 | Kohlmeyer et al. | 98/30 |
| 3,446,272 | 5/1969 | Gaines, Jr. | 236/44 R X |
| 3,503,137 | 3/1970 | Wilson | 236/44 R X |
| 3,552,097 | 1/1971 | Grasseler | 98/30 X |
| 3,855,371 | 12/1974 | Morrow et al. | 261/DIG. 15 X |
| 3,901,268 | 8/1975 | Mullins | 137/318 |
| 4,047,328 | 9/1977 | Kehl et al. | 98/30 X |

Primary Examiner—William E. Wayner
Assistant Examiner—William E. Tapolcai, Jr.
Attorney, Agent, or Firm—Posnack, Roberts, Cohen & Spiecens

[57] ABSTRACT

A greenhouse is provided with a humidifying apparatus which is located at the top of the greenhouse and includes elements for controllably humidifying the greenhouse and to circulate air therein while displacing heat downwardly from the top section of the greenhouse. The humidifying apparatus includes a misting valve connected in series with a solenoid valve, there being further provided a control which actuates the solenoid valve selectively dependent upon the percentage of humidity in the greenhouse. A pair of fans are provided on opposite sides of the misting valve, these fans facing downwardly to propel air downwardly in the greenhouse both for the purpose of air circulation and for the purpose of cycling heat downwardly since it tends to collect in the top of the greenhouse.

10 Claims, 4 Drawing Figures

4,197,991

1

GREENHOUSE ENVIRONMENTAL CONTROL SYSTEM

FIELD OF INVENTION

This invention relates to greenhouses and, more particularly, to apparatus for humidifying greenhouses and circulating air therein while displacing heat from the upper portions thereof to the lower portions thereof.

BACKGROUND

Hobby style greenhouses have become very popular. These are essentially miniature greenhouses in which the owner can grow plants of various types while protecting the same from inclement weather conditions and assuring optimum usage of solar energy.

Known hobby style greenhouses require much attention. First of all, it is essential to humidify the same since lack of humidity in a greenhouse will have a harmful effect on botanical life whereas excessive moisture in a greenhouse may likewise have a deleterious effect especially in encouraging the growth of fungus and the like. Furthermore, the circulation of air in a greenhouse can be a very significant problem since it is known that the absence of air circulation will promote the growth of fungus and, otherwise, have harmful effects on the plant life growing therein.

In addition to the above, it is known that the heat accumulated in a greenhouse tends to gather at the top or roof portions thereof whereat, in addition, incoming solar energy serves only to cause the heat to accumulate even more disproportionately in the upper reaches of the greenhouse. Substantial advantage can be gained if the heat can be caused to distribute more homogeneously throughout the structure.

SUMMARY OF INVENTION

It is an object of the invention to provide an improved greenhouse.

Yet another object of the invention is to provide an improved greenhouse with controlled humidity therein.

Still another object of the invention is to provide an improved greenhouse wherein air circulation is greatly improved.

A further object of the invention is to provide an improved greenhouse having therein means to displace heat downwardly in order to distribute the heat more homogeneously throughout the structure.

Still another object of the invention is to provide a demountable humidifying device which is readily added to existing greenhouse structures and/or removed therefrom.

Another object of the invention is to provide automated humidity control in order to avoid the need for constant supervision of hobby style greenhouses and the like.

In achieving the above and other objects of the invention there is provided a greenhouse comprising a plurality of sides and a roof section atop said sides and means in said roof section to humidify the greenhouse and to circulate air therein while displacing heat downwardly from said roof section. The aforesaid means comprises a source of water, a solenoid valve connected to said source for the selective release of water, a misting valve coupled to said solenoid valve to form a mist of water released by said solenoid valve, a control to actuate said solenoid valve selectively dependent on the percentage of relative humidity in the greenhouse, at least one fan adjacent the misting valve said fan facing downwardly to propel air downwardly into the greenhouse and a source of electrical power connected to the fan, and a source of water connected to the aforesaid solenoid valve.

According to a feature of the invention, the misting valve preferably faces downwardly. According to another feature of the invention, two of the aforesaid fans are provided with a rectangular case having two end portions respectively supporting said fans and supporting the aforesaid solenoid valve and misting valve therebetween.

According to another feature of the invention, a screening is provided beneath the aforesaid fans and a box is suspended from the case housing the aforesaid misting valve and solenoid valve.

According to another aspect of the invention, there is provided a demountable apparatus for humidifying a greenhouse and circulating air and heat therein as aforesaid. This apparatus comprises an elongated frame constituting an open box having a central portion and opposite end portions on opposite sides of said central portion, fans respectively positioned in said end portions and protected by said frame, screens on said frame adjacent said fans, a support depending from said central portion of said frame and defining a chamber, and a humidity control means on said support externally of said chamber. Moreover, there is provided a misting valve extending through said support from within said chamber to outside of said support, a solenoid valve hydraulically coupled to said misting valve and electrically coupled to said control means to be operated thereby an electrical power source to supply power to said fans and to said solenoid valve via said control means and a water supply to supply water to said misting valve via said solenoid valve.

Supplemental to the above, the water supply includes a tube having a proximal end coupled to said solenoid valve and a distal end, and a self-drilling valve means on said distal end.

In addition to the above, there may be provided a manually operated toggle switch coupled between said power source and said fans.

According to another feature of the invention, there may be employed a polyvinyl chloride tube coupling the aforesaid valve and valve means.

Yet another feature of the invention finds the misting valve depending downwardly from the aforesaid support.

The above objects, features and advantages of the invention will be more clearly understood from the detailed description which follows hereinbelow. Other objects, features and advantages of the invention will also be understood from the following description.

DETAILED DESCRIPTION

According to the invention, there is provided an apparatus for humidifying a greenhouse and circulating air and heat therein. More particularly, the apparatus is provided in the roof section of the greenhouse to humidify the same while, at the same time, providing for circulating air therein while displacing heat downwardly from the roof section of the greenhouse or the upper reaches thereof.

Figure 1:
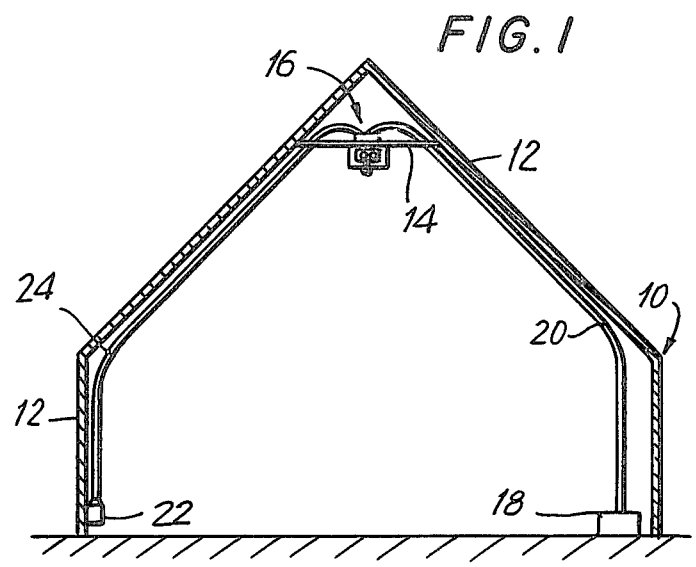
FIG. 1 is a diagrammatic sectional view of a greenhouse employing the humidifying apparatus of the invention.

In FIG. 1 is diagrammatically illustrated a greenhouse 10 formed of glass panes supported in a frame work in the usual and known style of a hobby-type greenhouse which is currently quite popular.

The greenhouse 10 conventionally includes a plurality of sides 12 and a roof section 12, there being provided rafters 14 which are utilized in accordance with the invention.

More specifically, in accordance with the invention, there is provided a humidifying apparatus 16, the details of which will be hereinafter made apparent. There is, also, coupled to the humidifying apparatus a source of water diagrammatically indicated at 18, this source being coupled to the humidifier via a tubing 20. Similarly, there is provided a source of electrical power, the source being diagrammatically indicated at 22 and being coupled to the humidifying apparatus by means of a line 24.

Figure 2:
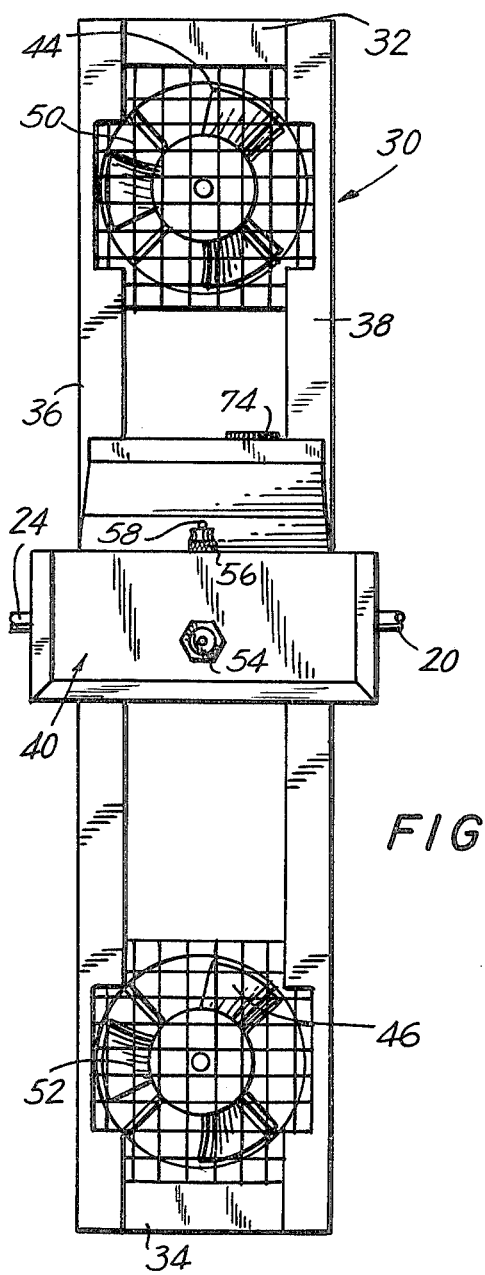
FIG. 2 is a bottom view of the demountable humidifying apparatus of FIG. 1 on an enlarged scale.

In FIG. 2 is illustrated a frame 30 consisting of ends 32 and 34 connected by sides 36 and 38. The ends 32 and 34 define opposite end portions of the apparatus which is generally indicated at 40 whereat is mounted a humidifying control 42.

At the end portions of the frame are mounted fans 44 and 46. These fans are preferably solid state fans which generate minimum amounts of heat and are known for their reliability. Located beneath the fans are screens 50 and 52, these being intended to protect the fans from mechanical damage, while at the same time preventing engagement of the fans in a harmful manner by persons located within the greenhouse structure.

Visible in FIG. 2 are the bottom of the misting valve 54 and the mounting 56 of the toggle switch (not shown) having a chain control 58.

It will be noted that the frame 30 is an elongated frame constituting an open box wherein the fans are respectively positioned in the end portions and protected against damage by the frame and the screens located beneath the same.

Figure 3:
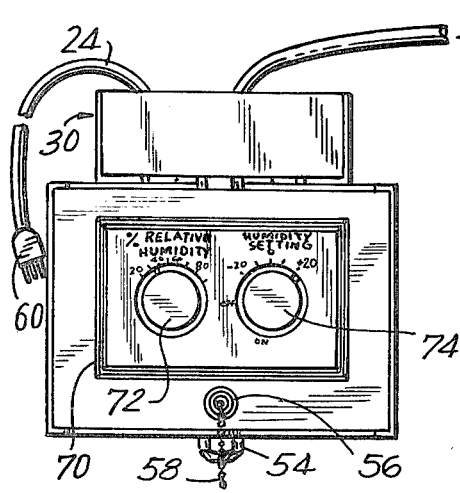
FIG. 3 is an end view of the demountable humidifying apparatus of FIG. 2.
Figure 3:
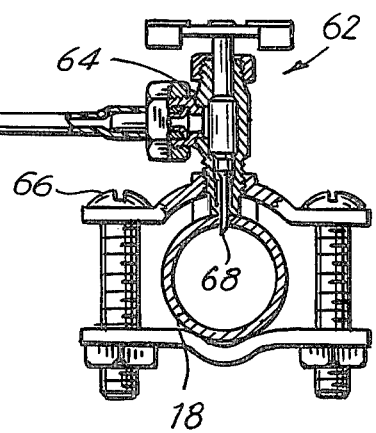

The frame 30 can also be seen in FIG. 3 whereat it can be seen that the humidifying control 42 is mounted in depending relationship relative to said frame.

Extending out of the frame at the top thereof will be seen the electric line 24 having a plug 60 at the extremity thereof for engagement with the source of power indicated generally at 22 in FIG. 1.

Also extending out of the box or frame 30 at the top thereof is a polyvinyl chloride tubing 20 having at the end thereof a self-drilling valve device intended to engage with the source of water 18 which in FIG. 3 is shown to be a piece of copper tubing or the like. The self-drilling valve is indicated particularly at 62. It is a commercially available device wherein the valve 64 receives the distal end of the tubing 20 and is held proximate the tubing 18 by means of bracket 66. Upon initial use, the pin 68 is used to puncture the tubing 18 and is, thereafter, withdrawn as a consequence whereof water may flow from the tubing 18 into the tubing 20 according to controls to be exercised as will be indicated hereinafter.

The specific controls of the humidifier control are mounted on a commercially available unit 70. Thereupon are located a meter 72 by means of which percentage relative humidity can be determined. The off-on switch, as well as the humidity setting control, is indicated generally at 74. These function in known manner. When it is desired to increase the humidity, the control 74 is moved clockwise. When it is desired to decrease the humidity, control 74 is moved in a counter-clockwise direction. The control 74 can be used to turn off the humidifier and, as well, to turn the same on and select the humidity settings.

Also visible in FIG. 3 is the toggle switch mount 56 mentioned hereinabove, as well as the chain control 58. The bottom of the misting valve 54 is also visible in FIG. 3.

Figure 4:
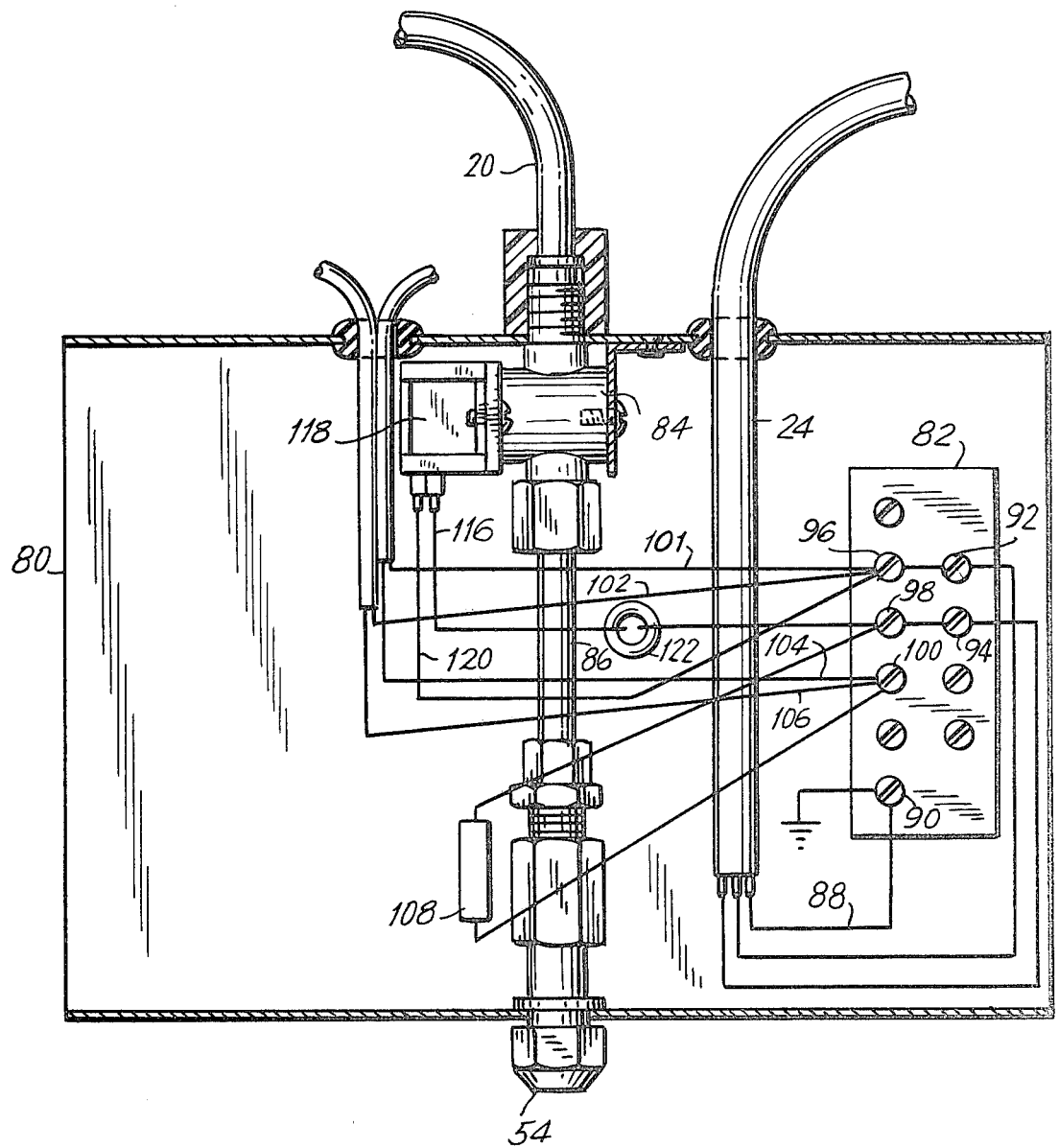
FIG. 4 is a view of the opposite side of the humidifying apparatus illustrated in FIG. 3 with the cover removed to expose the internal elements.

Reference to FIG. 4 will show the internal details of the humidifier employed in accordance with the invention. More specifically, in FIG. 4 is shown a support 80 which depends from the above mentioned frame 30. Mounted therein is a terminal board 82, a solenoid valve 84 and the aforementioned misting valve 54. The misting valve is coupled to the solenoid valve by means of a polyvinyl chloride tube 86. This may be, for example, one quarter of an inch tubing.

The electric line 24 carries three phases. One phase is indicated at 88. It is connected to terminal 90 which is grounded. The other two phases are connected to terminals 92 and 94 which, in turn, are jumped to terminals 96 and 98. From terminal 96 two connections 101 and 102 are made to respective of the aforementioned fans. Return connections 104 and 106 are made to terminal 98 and to terminal 100. A toggle switch which has been mentioned hereinabove, is indicated generally at 108. It is operated by the aforesaid manually controlled chain 58 and controls the operation of fans 44 and 46 (FIG. 2).

Power is supplied via terminal 98 to a terminal 99 and thence via line 116 to the coil 118 of solenoid valve 84. The return line is indicated at 120 and is connected to terminal 96. The line 116 is connected to the humidistat indicated at 122. This is adjustable by means of the aforementioned control 74 (FIG. 3) and operates when the humidity in the greenhouse is lower than that desired to actuate valve 118 to release water via tube 86 into the misting valve 54.

The misting valve is designed to provide a mist under conventional water pressure which is available at an ordinary house tap. It is a commercially available valve. The valve depends downwardly from the support which, in turn, depends downwardly from the aforementioned frame whereby a mist is released downwardly into the greenhouse confines.

The demountable humidifier of the invention operates in a number of ways. First of all, it operates to release a mist downwardly into the greenhouse confines to increase the humidity thereof and to achieve a percentage relative humidity such as is selected by the control 74 and is read upon the dial 72 (FIG. 3). In addition, the fans operate to circulate the humidity downwardly and, at the same time, to maintain air circulating within the greenhouse structure. The fans are manually controlled independently of the humidity control and thus it is possible to operate the fans independently without the operation of the humidifier when such a condition is desired.

In addition, it is known that the greater amount of the heat tends to accumulate in the upper or roof section of a greenhouse and that this is undesirable since a more homogeneous distribution of heat is to be preferably obtained to simulate outdoor ambient conditions. For this reason, the circulation of air by use of the fans operates to displace heat downwardly within the greenhouse confines in order to more homogeneously distribute the same.

It will now be obvious to those skilled in the art that there has been provided a greenhouse wherein a solenoid valve and misting valve are arranged in such a form in cooperation with a bracketing pair of fans in a demountable structure as to afford optimum conditions for the growth of botanical life. There will now be obvious to those skilled in the art many modifications and variations of the structures set forth hereinabove. These modifications and variations will not depart from the scope of the invention if defined by the following claims.

What is claimed is:

1. A greenhouse comprising a plurality of sides and a roof section atop said sides, and means in said roof section to humidify the greenhouse and to circulate air therein while displacing heat downwardly from said roof section, said means comprising a source of water, a solenoid valve connected to said source for the selective release of water, a misting valve coupled to said solenoid valve to form a mist of water released by said solenoid valve, a control to actuate said solenoid valve selectively dependent on the percentage humidity in said greenhouse, two fans adjacent the misting valve, said fans facing downwardly to propel air downwardly in the greenhouse, a source of electrical power connected to the fan, a case having two end portions respectively supporting said fans and supporting the solenoid valve and misting valve between said fans, and means to actuate said fans independently of said misting valve.

2. A greenhouse as claimed in claim 1 wherein the misting valve faces downwardly.

3. A greenhouse as claimed in claim 2 comprising two said fans, a rectangular case having two end portions respectively supporting said fans and supporting the solenoid valve and misting valve therebetween.

4. A greenhouse as claimed in claim 3 comprising screening beneath said fans.

5. A greenhouse as claimed in claim 4 comprising a box suspended from said case and housing said misting valve and solenoid valve.

6. Apparatus for humidifying a greenhouse and circulating air and heat therein, said apparatus comprising an elongated frame constituting an open box having a central portion and opposite end portions on opposite sides of said central portion, fans respectively positioned in said end portions and protected by said frame, screens on said frame adjacent respective of said fans, a support depending from the central portion of said frame and defining a chamber, a humidity control means on said support externally of said chamber, a misting valve extending through said support from within said chamber to outside of said support, a solenoid valve hydraulically coupled to said misting valve and electrically coupled to said control means to be operated thereby, an electrical power source to supply power to said fans and to said solenoid valve via said control means, further means to operate said fans independently of said solenoid and misting valves and a water supply to supply water to said misting valve via said solenoid valve.

7. Apparatus as claimed in claim 6 wherein said water supply includes a tube having approximal end coupled to said solenoid valve and distal end, and a self-drilling valve means on said distal end.

8. Apparatus as claimed in claim 7 wherein said further means comprises a manually operated toggle switch coupled between said power source and said fans.

9. Apparatus as claimed in claim 8 comprising a polyvinyl chloride tube coupling said valves.

10. Apparatus as claimed in claim 8 wherein said misting valve depends downwardly from said support.

* * * * *